June 4, 1963 J. A. TORRENCE 3,092,761

REMOTE CONTROL APPARATUS

Filed April 4, 1960 2 Sheets-Sheet 1

INVENTOR.
James A. Torrence
BY Mueller & Aichele
Attys.

REMOTE CONTROL APPARATUS

Filed April 4, 1960 2 Sheets-Sheet 2

INVENTOR.
James A. Torrence
BY Mueller & Aichele
Attys.

United States Patent Office 3,092,761
Patented June 4, 1963

3,092,761
REMOTE CONTROL APPARATUS

James A. Torrence, Franklin Park, Ill., assignor to Motorola, Inc., Chicago, Ill., a corporation of Illinois Filed Apr. 4, 1960, Ser. No. 19,783
5 Claims. (Cl. 317—149)

This invention relates to electrical control apparatus responsive to wave signals of a given frequency and of predetermined character, and more particularly to electrical circuits which segregate functions on a pulse characteristic basis. The invention is particularly applicable to remote control systems for television receivers.

Several "wireless" type systems for remotely controlling operational functions of television receivers are known today. A common approach has been to utilize sound energy for the radiated signal, with a transmitter provided to generate different signal frequencies to control different receiver functions. The use of multiple frequencies, however, complicates the remote transmitter and requires a multi-section detector with separate sections responsive to each control signal frequency.

Accordingly, it is an object of the present invention to provide an improved multiple-function remote control system for electrically controlled devices which is actuated by signals of a particular pulse character but of a single frequency.

Another object is to provide a television receiver remote control system which is simple and convenient to operate for rapidly and accurately performing either of two control functions in response to a given coded sequence of signal pulses of a single predetermined frequency.

A further object is to provide a system of the preceding character which is selectively responsive to changes in the duration of signal pulses.

A feature of the invention is the provision of an electronic control system adapted for remote actuation by at least a two-function control transmitter providing characteristic signals at only one predetermined frequency which are sensed by the system to operate sequentially related relays and time constant energy supply circuits so as to control switches in at least two separate functional circuits of a television receiver corresponding to the function controls of the transmitter.

Another feature is the provision of a control circuit having a locking or stepping type relay device responsive to pulses of at least a minimum duration which operates the on-off control circuit of the television receiver upon receipt of single pulses and also energizes a channel change control circuit upon receipt of two such pulses received within a given time interval.

Another feature is the provision of a control circuit for a television receiver including a stepping type relay device controlled by a relay vacuum tube having a grid circuit which is selectively responsive to two signals of different duration to cause respective actuation of the two functions of the receiver.

In accordance with the invention there is provided a control receiver particularly adapted for selectively actuating the on-off switch or the channel selector mechanism of a television receiver in response to predeterminted first and second received signals of the same frequency. One form of the receiver is responsive to a one pulse-two pulse signal code and includes suitable receiving means to develop an output signal in response to the received signals. This output signal is applied to the grid circuit of a control tube to energize a bistable type relay switch having a plurality of pairs of contacts. A first pair of switch contacts is series connected in the on-off circuit of the television receiver while a channel change circuit is connected to a second set of switch contacts. The channel change circuit includes a resistor-capacitor network for energizing a channel change relay connected to the television channel selector mechanism. On reception of a single pulse, the bistable relay switch is operated to turn on the television receiver or, if the receiver were previously energized, to turn it off. When the receiver is turned off, the capacitor of the resistor-capacitor network is rapidly charged and then slowly discharged. If the receiver is turned back on within a given short time interval, for example by reception of a second pulse immediately following the first pulse, the undischarged capacitor is coupled through the second set of switch contacts to a circuit for energizing the channel change relay which is thereby triggered.

In a modified form of the circuit, it is possible to to use a short pulse for the on function and a long pulse for performing the off and channel change functions in a television receiver. In this modification a further resistor capacitor network is coupled to the grid circuit of the relay control tube so that with the television receiver turned on a capacitor is charged in such network and when the receiver is turned off the capacitor is connected in a manner to momentarily bias to cut-off the relay control tube. In this way, a short pulse turns the set off by operating the bistable relay switch. A long pulse, one longer than the time necessary for the control tube capacitor to discharge, is used to turn the set off and then back on. The relay switch is triggered back to the on position by the latter portion of the relatively long pulse, still being received at a time when the control tube capacitor no longer maintains the tube cut off. Thus, in rapid succession the receiver is turned off to charge the above mentioned capacitor in the channel change circuit, and then immediately turned on to utilize that charge in operating the channel change relay. The long pulse also turns the set on since it has sufficient duration to charge the control tube capacitor and cause operation of the bistable relay.

Figures 1, 2:
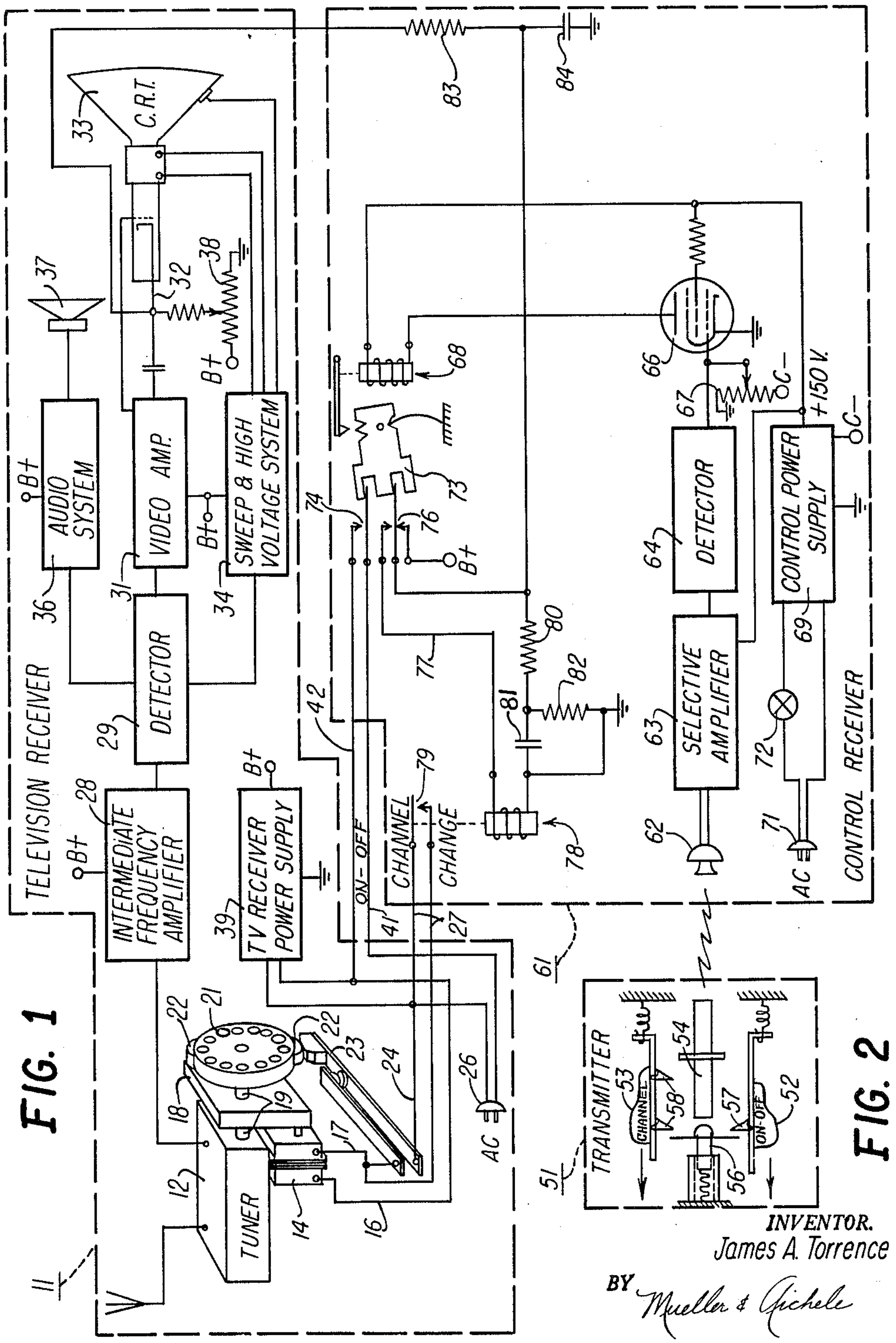
FIG. 1 is a diagram, partly schematic and partly in block form, showing a remote control receiver as used with a television receiver for a one pulse-two pulse single frequency system.
FIG. 2 is a simplified plan view of a remote control transmitter adapted for use with the control receiver of FIG. 1.

Referring now to the drawings, in FIG. 1 a conventional television receiver 11 is shown in a simplified block diagram with a motorized tuning mechanism. This mechanism includes a tuner 12 which may be adjusted to a desired channel by means of motor 14. The motor is energized by leads 16 and 17 to drive gear reduction apparatus 18 which in turn drives control shaft 19 at approximately 24 r.p.m. Shaft 19 carries an index wheel 21 having a series of adjustable cams 22 about the periphery thereof corresponding to each channel to which tuner 12 may be adjusted. Each of the cams 22 may be set to engage and open a switch 23 positioned adjacent the periphery of the index wheel as this wheel rotates. The cams may be locked in an engaging or non-engaging position so as to either open the switch as they contact it or to pass by the switch without opening it. Swith 23 is series connected between the motor lead 17 and a power lead 24 connected to the alternating current plug 26. A control circuit including a pair of leads 27, connected across a channel change switch to be described hereafter, is provided to shunt switch 23 in order to start the motor. Once the motor has started, index wheel 21 will rotate, moving index cam 22 out of engagement with the operating arm of switch 23. If leads 27 are then opened, the motor 14 will continue to run until the power circuit again is broken by another cam 22 opening the switch 23.

Further portions of television receiver 11 are shown in block form and may include an intermediate frequency amplifier 28, a detector 29 and a video amplifier 31. Signals from the video amplifier are applied to cathode 32 of cathode ray tube 33 for reproduction of the television image. The detector 29 is also connected to a sweep and high voltage system 34 providing scanning signals and the high voltage screen potential for tube 33. The detector circuit is further connected to an audio system 36 which operates a loudspeaker 37. The foregoing portions of the television receiver 11 are entirely conventional, their operation being well understood in the art and therefore they are not described in detail herein.

Direct current at the operating or B+ potential is supplied to the foregoing receiver portions as well as to one side of a brightness control potentiometer 38 by a television receiver power supply 39. One side of the A.C. connection from plug 26 to power supply 39 includes another control circuit comprising leads 41 and 42 connected across a remote on-off switch operated in a manner to be subsequently described in detail.

A remote control system constructed in accordance with the disclosed embodiments of the invention described hereafter controls both the on-off and the channel change functions of the television receiver 11. This is accomplished, for example, by transmitting coded signal energy from the viewer's position remote from the television receiver. A suitable hand-held transmitter may be provided for this purpose and may be of one of a number of types of basic transmission systems such as radio, electromagnetic induction, light or sound. An ultrasonic system is employed in the described embodiments and a vibrator element is used for generating sound waves at either audible or ultrasonic frequencies. To control a multiplicity of functions it has been the practice in the prior art to generate a separate frequency for each function to be controlled, which entails a separate vibrator element and actuating means for each frequency. In practicing the present invention, however, only one frequency is necessary even though more than one function is controlled.

Accordingly, to remotely control two functions of receiver 11, an acoustic transmitter 51 (FIG. 2) is provided for convenient operation by the viewer. The basic elements of transmitter 51 are well known in the art and therefore are illustrated in simplified form. They include a sliding pushbutton 52 for the on-off function, a similar sliding pushbutton 53 for changing channels, a vibrator element or rod 54 and a sleeve guided, spring biased hammer 56. The rod 54 constitutes the single transmitting element for this dual function transmitter and is constructed with the proper dimensions to vibrate at a predetermined natural ultrasonic frequency. In a manner to be described hereafter, a single pulse of radiated energy at the predetermined frequency and of a duration of T seconds will control the on-off function of the television receiver. To provide such a signal from transmitter 51, pushbutton 52 is slid in the direction of the arrow so that an engaging element or pawl 57 pivotally carried thereon and lightly biased to a perpendicular position therewith engages, cocks, and finally releases the resilient extension of the spring biased hammer 56, thereby allowing the hammer to strike the end of vibrator rod 54 to excite the rod into longitudinal mode vibration. Thus, a sound wave is generated with a given peak amplitude which decays at a predetermined rate.

When the viewer wishes to change channels after the set has been turned on, he slides key 53 in the direction of the arrow so that each of two spaced pawls 58, provided on slide 53 in the manner of pawl 57, consecutively engage, cock and release the hammer. Two pulses are thereby produced, each substantially identical to the single pulse produced by key 52. Pawls 58 are spaced on the key 53 so that the two pulses are produced within a given time interval slightly greater than $T+T$ seconds. This interval is considerably shorter than the interval in which It would be possible to create two single pulses by twice actuating key 52.

A control receiver 61 is preferably constructed as an integral part of the television receiver. The sonic energy is received by a transducer or crystal microphone 62 which develops an electrical signal corresponding to the received signal. This signal is amplified by a suitable selective amplifier 63 coupled to microphone 62. Amplifier 63 may contain any desired number of stages and, along with microphone 62, the stages may be tuned very narrowly to the single predetermined frequency to take full advantage of the selectivity inherent in a single frequency remote control system. Amplifier 63 in turn is connected to a detector 64 which contains suitable circuitry to rectify and filter the amplified alternating signal so that a D.C. output voltage proportional to the amplitude and duration of the received pulse is provided. Detector 64 may also contain conventional integrator circuits which prevent signals of the predetermined frequency, when they are shorter than T seconds, from producing an output voltage, thus making the system more selective with respect to pulse duration.

The output of detector 64 is connected to the control grid of pentode vacuum tube 66, the tube being adjustably biased for controlling sensitivity by means of grid bias potentiometer 67. The tube 66 may be any multi-element vacuum tube having at least a control grid, an anode and a cathode suitable for use as a relay control tube. The plate circuit of control tube 66 includes the coil of a relay 68 and is connected to a power supply 69 providing operating potential for the remote control receiver at a voltage, for instance, of ±150 volts. The power supply 69 is energized through connections to a power line plug 71, here shown to be separate but which may be eliminated by connecting power supply 69 to plug 26. An on-off power supply switch 72 controls the power line connections and may be operated when the transmitter unit 51 is stored in a suitable cradle on the receiver housing. In this manner, the remote control receiver unit 61 may be energized very conveniently according to viewer usage and independently of the television receiver.

The circuitry of remote control receiver 61 thus far described serves to actuate relay 68 when an ultrasonic signal is received of the correct frequency and duration, and of a given minimum amplitude sufficient to excite both amplifier 63 and detector 64 and cause an output voltage capable of driving control tube 66 far enough into conduction to trip relay 68. Thus, the one-pulse signal produced upon actuation of key 52 results in the relay 68 tripping once while the two pulse signal produced by actuating key 53 will cause the relay 68 to trip twice.

Segregation of functions for the one pulse-two pulse system is provided by the mechanism and circuitry controlled by the operation of the movable arm of relay 68. A rocker 73 is spring biased for bi-stable operation in the manner of a conventional stepping or latching type relay so that it will remain in either the open or closed condition, thus requiring two actuations by the movable arm of relay 68 for a complete cycle. Rocker 73 simultaneously actuates the movable arms of a plurality of sets of controls including a S.P.S.T. switch 74 and a S.P.D.T. switch 76. The terminals of the set of contacts comprising switch 74 are connected in series with the on-off control circuit leads 41 and 42 of the television receiver 11 so that each time relay 68 is tripped the television receiver will be either turned on or off, depending upon whether switch 74 is open or closed prior to actuation of relay 68. Consequently, the on-off function is controlled by the single pulse sent by key 52 since it is this pulse that results in switch 74 remaining in a changed condition.

The channel change function is segregated by the operation of the circuitry connected to switch 76. One fixed contact of this switch is connected to a source of direct current potential, here shown to the the B+ source for the television receiver. The other fixed contact of switch 76 is connected by a lead 77 to one terminal of the coil of a momentary type relay 78, the opposite coil terminal being connected to a reference point or chassis ground. Relay 78 operates a S.P.S.T. switch 79 series connected with leads 27 of the channel change control circuit. An RC circuit consisting of resistor 80 connected in series with electrolytic capacitor 81 is connected between the ground terminal of relay 78 and the movable center arm of switch 76. A large bleeder resistor 82 is connected between the junction of resistor 80 with capacitor 81 and the reference point.

A blanking circuit associated in parallel with the foregoing RC network is connected between the movable arm of switch 76 and the cathode 32 of cathode ray tube 33. This circuit includes a series blocking resistor 83 and a filter capacitor 84 connected between the high potential side of resistor 83 and ground.

In operation, the foregoing circuitry associated with switch 76 responds to the two pulse signal, if the television receiver 11 is in the on condition, to produce the channel change function. Assume that rocker 73 is in the on position, with switch 74 closed and the movable arm of switch 76 closed with the fixed contact connected to lead 77. Then upon actuation of channel change key 53, the characteristic two pulse signal causes relay 68 to twice actuate rocker 73. The first pulse moves the rocker to the position shown in FIG. 1. This opens switch 74, turning the television receiver off. At the same instant switch 76 connects the B+ potential across the parallel circuits consisting of the RC network coupled to the channel change relay and the blanking circuit connected to the cathode ray tube. Thus, the electrolytic capacitor 81 is charged and the screen is instantly blanked so that the viewer does not see the raster die. Suitable values are chosen for resistor 80 and capacitor 81 so that capacitor 81 is charged to a predetermined value by the decaying B+ from the television receiver within the time interval between the first and second tripping of rocker 73 caused by the two pulse signal.

Reception of the second pulse of the two pulse signal causes rocker 73 to return to its original position, thereby simultaneously closing switch 74 to turn the set back on, removing B+ so that the cathode ray tube 33 is no longer blanked and closing the movable arm of switch 76 across line 77. This connects the charged electrolytic capacitor 81 across the coil of channel change relay 78 so that it discharges current therethrough, closing switch 79 across leads 27. Switch 79 is of the momentary type with a spring biased movable arm which will remain closed only as long as the coil of the relay 78 is sufficiently energized to overcome the bias. Since the on-off leads 41 and 42 are now also closed through switch 74, the closed channel change relay switch 79 shunts A.C. power around switch 23 to energize motor 14. As previously described, index wheel 21 will thereupon rotate, allowing switch 23 to close. With switch 23 closed, a motor energization path is provided in parallel with switch 79. Thus, the motor is now energized independently of relay 78 and will continue to run until the next engaging cam 22 opens switch 23 to stop the motor in the proper position for tuning the corresponding channel. In the meantime, leads 27 are opened by the de-energization of relay 78 since the discharge time constant of electrolytic 81 is less than the time interval required to change channels. This insures that switch 23 will not be shunted and therefore prevents the motor from overrunning a cam stop.

It is not possible to change channels unless the television set has first been turned on. To illustrate, assume the same sequence with rocker 73 going through a complete cycle, but starting in the condition as shown in FIG. 1 where switch 74 is open and the set is off. The first pulse will turn the set on and complete the RC circuit across relay 78, but relay 78 will not be energized since capacitor 81 is now uncharged. This condition is due to the operation of bleeder resistor 82 which provides a discharge path for capacitor 81. The time constant of resistor 82 and capacitor 81 is much greater than that of the RC circuit and thus resistor 82 has a negligible effect on the charging and discharging sequences of the RC circuit. The second pulse then returns rocker 73 to the original position and the set is again turned off, capacitor 81 being charged by the fading B+ potential and then discharged through resistor 82 so that it again returns to an uncharged condition. It is to be noted that there is always sufficient potential remaining at the moment the set is turned off to charge capacitor 81, and therefore it is necessary to provide the delayed discharge path through resistor 82. Thus, should one pulse then be sent by key 52, a dead capacitor will be connected across the channel change relay so that a channel change will not occur in turning the set on.

Figures 3, 4:
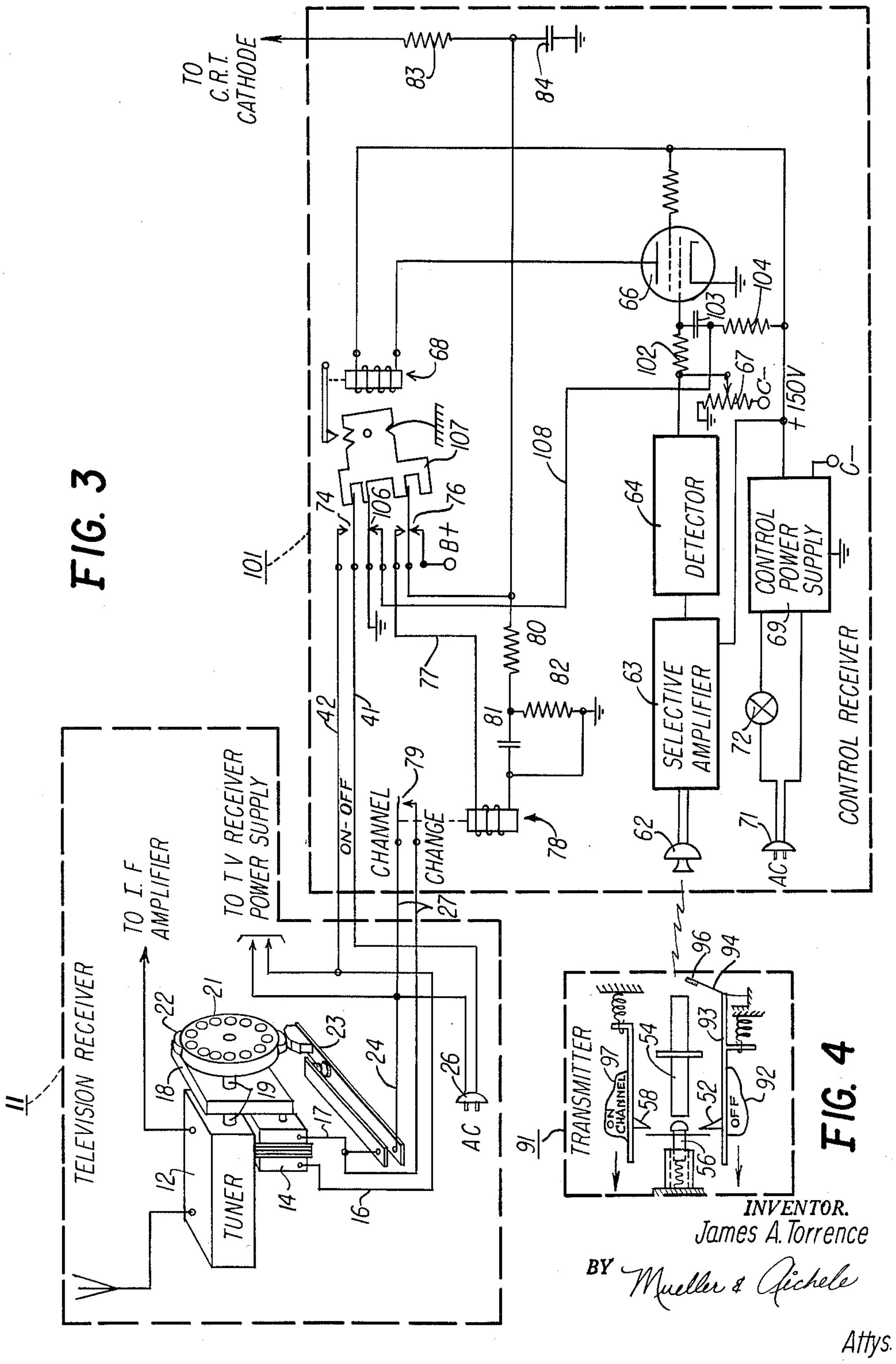
FIG. 3 shows a modified remote control receiver adapted to control the television receiver of FIG. 1 for a short pulse-long pulse type single frequency system.
FIG. 4 is a simplified plan view of a remote control transmitter adapted for use with the control receiver of FIG. 3.

Two function control is also possible in the modification as illustrated in FIG. 3 and the same functions can be performed with a two key, single frequency transmitter (FIG. 4) adapted to send a short and a long pulse rather than one or two pulses. No modification of the television receiver is necessary and therefore only the tuner portion of receiver 11 is shown in FIG. 3. Those elements of FIGS. 3 and 4 identical with the elements described in connection with FIGS. 1 and 2 are given the same reference numerals and their description not repeated.

A slightly modified ultrasonic transmitter 91 is provided to selectively generate a short pulse having a duration of $T_1$ seconds and a long pulse having a duration of $T_2$ seconds. Like the pulses sent by transmitter 51, these pulses are of a single frequency and are generated when rod 54 is struck to vibrate at its natural frequency. An off push-button or key slide 92 carries an engaging element or pawl 57 in the manner of key 52, but is further provided with a rearward extension 93. This extension engages a resilient arm 94 carrying a dampening pad 96 on its free end. When key 92 is slid in the direction of the arrow, pawl 57 first engages, cocks and then releases hammer 56. Rod 54 will first be struck on one end by the hammer 56 and then damped on its other end by the pad 96. It will be evident that the adjustment of the extension 93 and the location of resilient arm 94 determine the duration of $T_1$ of the pulse generated by key 92. The on-channel change key 97 corresponds to the key 53 of transmitter 51 except that it carries just one engaging member 58 instead of two. Adjusting the length of cocking engagement of this key with the spring biased hammer 56 will determine the duration $T_2$ of the long pulse.

A remote control receiver 101, generally similar to control receiver 61, is provided to sense and respond to the long and short signals. Additional elements in receiver 101 include a time delay grid biasing network for control tube 66. This network includes a resistor 102 connected to the variable tap of grid bias potentiometer 67 and the control grid of tube 66, and an RC network consisting of a capacitor 103 in series with a resistor 104 and connected between the grid of tube 66 and the output of power supply 69. A three switch rocker 107 is provided in place of the two switch rocker 73 and an extra S.P.S.T. switch 106 is added to operate in common with switches 74 and 76. The movable arm of switch 106 is grounded and its fixed contact is connected by a lead 108 to the junction of capacitor 103 with resistor 104. The circuitry associated with switches 74 and 76 is the same as that previously described. Since triple rocker 107 is also of the bi-stable type, it follows that the same control functions will occur with respect to the television receiver 11 if rocker 107 is actuated in the same manner as rocker 73.

In describing the operation of the television set 11 as controlled by transmitter 91 and control receiver 101, it will first be assumed that the set is in the on condition with rocker 107 in the opposite position from that shown in FIG. 3. Thus, switch 74 is closed, switch 106 is open and the movable arm of switch 76 is disconnected from B+ and connected to lead 77. In this condition lead 108 is disconnected from ground. Hence, the grid side of capacitor 103 will acquire a negative charge since it is connected through resistor 102 and potentiometer 67 to the C— potential, while the opposite side of capacitor 103 will be positively charged to 150 volts by the connection through resistor 104 to the positive output of power supply 69. It should be noted that the negative potential on the grid side of capacitor 103 is applied between the grid and cathode of tube 66. Thus, if a short pulse is received, the resulting detector output is applied to the grid causing the grid to become less negative until it rises above the cutoff point. The strength of the detector output required may be varied to the desired level by use of potentiometer 67 which controls the amount of negative bias placed on the grid. The grid potential will continue to rise until the coil of relay 68 is conducting sufficient plate current to actuate its movable arm. When this occurs, rocker 107 is tripped to the off position. At the same time the positive side of charged capacitor 103 is connected to ground through switch 106, causing capacitor 103 to discharge through resistor 102 and the grounded side of potentiometer 67 and thus momentarily placing a negative bias on the grid of relay tube 66. If the short pulse has not already ceased, then this discharge will cause the tube to stop conducting, thereby releasing relay 68 with the bistable rocker 107 remaining in the off position.

Upon receipt of a long pulse of $T_2$ seconds duration (assuming the set is now off so that capacitor 103 is grounded) the grid will again become less negative until its potential returns to a point above cutoff where sufficient current will again flow to energize relay 68 so that rocker 107 is tripped to the on position. When this happens, capacitor 103 is disconnected from ground, charging it as before from power supply 69. With the expiration of the long pulse, relay 68 is de-energized and its movable arm released.

Once the set is turned on, receipt of another long pulse will change channels. Thus, with lead 108 disconnected from ground, the first portion of the long pulse, like the sequence described above for the short pulse, raises the grid potential above cutoff and energizes relay 68, tripping rocker 107 to the off position. This grounds charged capacitor 103, placing a negative bias on the grid which opposes the output signal applied thereto and drops the grid potential below cutoff to release the arm of relay 68. Unlike the short pulse, the duration $T_2$ of the long pulse is long enough to continue until the applied signal sufficiently overcomes the dying discharge potential of capacitor 103 to cause tube 66 to once more conduct, tripping rocker 107 back to the on position. As in the first embodiment, tripping the rocker off and then on produces the channel change function.

If a short pulse having a duration of $T_1$ seconds is generated by pushing key 92 of transmitter 91 while the television receiver is turned off, no functional response will occur. This is due to the time constant of the RC circuit formed by resistor 102 and grounded capacitor 103. The applied signal, when it has a duration of only $T_1$ seconds, is expended in charging capacitor 103 before it can raise the grid above cutoff. The duration $T_2$ of the long pulse, however, is long enough to overcome the time constant of the grid circuit so that the applied signal resulting therefrom is effective to trip the relay to the on position. However, either the short or long pulse will turn the set from on to off, due to the fact that in the on position capacitor 103 is not grounded, the large blocking resistor 104 then being connected in series with it to substantially cancel out the RC effect of resistor 102 and capacitor 103.

Thus, with the modifications in the grid circuitry described above, the relay control tube 66 is also made to function once or twice, but in response to a predetermined long and short pulse code rather than to a one pulse-two pule code. The relative durations ($T_1$ and $T_2$) of the long and short pulses determine the desired time constant for the above sequences and therefore the values of resistors 102, 104 and capacitor 103.

In a practical system constructed in accordance with the foregoing description the following circuit components and values were used:

| | | |
|---|---|---|
| Electrolytic capacitor 81 | microfarads | 10 |
| Resistor 80 | ohms | 10 |
| Resistor 82 | do | 1500 |
| Resistor 83 | do | 150,000 |
| Capacitor 103 | microfarads | .05 |
| Resistor 102 | megohms | 1 |
| Resistor 104 | do | 2.2 |

The above components and values are listed merely by way of illustration and in no sense by way of limitation.

I claim:

1. In a remote control system for operating two functions of an electrical device by means of pulsed signal energy, a receiver for the signal energy including in combination, signal translating and detecting means adapted to provide a output voltage in response to received pulse signal energy, first latching relay means coupled to said detecting means and having a plurality of sets of contacts each operable to first and second positions upon successive actuations of said first relay means produced by the output voltage from said detecting means, a first control circuit of the electrical device connected across a first set of contacts of said sets of contacts for control of the same, second relay means having switch means controlled thereby, second circuit means intercoupling said second relay means and a second set of contacts of said sets of contacts, said second circuit means including capacitor means connected to said second relay means in the first position of said second set of contacts for discharging through said second relay means and actuating the same thereby, a source of direct current potential subject to time decay and connected across said capacitor means in the second position of said second set of contacts of said first switch means for charging said capacitor means, and a second control circuit of the electrical device connected across said second switch means whereby successive actuation of said first relay means to the second position and then to the first position respectively charges said capacitor and discharges the same to actuate said second relay means and thereby produce a change in said second control circuit, and whereby single actuation of said first relay means to the first or second position controls said first control circuit.

2. In a remote control system for operating two functions of an electrical device by means of pulsed signal energy, said signal energy being transmitted selectively as a first signal comprising one pulse of predetermined duration and as a second signal comprising two of said pulses within a given time interval, a receiver responsive to said signal energy including in combination, signal translating and detecting means adapted to provide an output voltage in response to each received pulse of said signal energy, first latching relay means coupled to said detecting means and having first and second sets of contacts each operable to first and second positions upon successive actuations of said first relay means produced by the output voltage from said detecting means, first control circuit means of the electrical device connected across said first set of contacts so that each of said pulses of said signal energy controls said first control circuit means, second relay means having switch means controlled thereby, second circuit means including chargeable capacitor means connected across said second relay means in the first position of said second set of contacts for actuating said second relay means by discharging therethrough, a source of direct current potential subject to time decay in the first position of said first and second set of contacts over a period greater than said given time interval of said second signal and connected across said capacitor means in the second position of said second set of contacts for charging said capacitor means, and second control circuit means of the electrical device connected across said second switch means whereby upon operation of said first relay means from the second position of said contacts thereof in response to said second signal said capacitor actuates said second relay means to thereby control a second function of the electrical device.

3. In a remote control system for operating two functions of an electrical device by means of first and second signals having respective durations of $T_1$ and $T_2$ seconds, a receiver for said signals including in combination, signal translating and detecting means adapted to provide an output voltage in response to each of said received signals, an electron discharge device coupled to said detecting means to be controlled to a first condition of energization by the output voltage therefrom, first relay means operated by said electron discharge device and having latching switch means with a plurality of sets of contacts operable to first and second positions upon successive actuations of said first relay means caused by the output voltage from said detecting means, a resistor-capacitor-network coupled to said electron discharge device and having first capacitor means chargeable for establishing a predetermined bias thereof to a second condition of energization, a source of direct current potential for charging said first capacitor, a switching circuit including a third of said sets of contacts connected to charge said first capacitor in the first position and to apply the predetermined bias to said electron discharge device from said first capacitor in their second position, said network having a time constant such that said predetermined bias is overcome by said second signal to return said electron discharge device to the first condition of energization, first control circuit means of the electrical device connected across a first set of said contacts of said latching switch means so that each actuation thereof successively controls said first control circuit means, second relay means having switch means controlled thereby, second circuit means intercoupling said second relay means and a second set of said contacts of said latching switch means, said second circuit means including second capacitor means connected to said second relay means in the first position of said second set of contacts for actuating said second relay means by discharging therethrough, a further source of direct current potential subject to time decay in the second position of said second set of contacts and connected across said second capacitor means in the second position of said second set of contacts of said latching switch means for charging said second capacitor means, and second control circuit means of the electrical device connected across said switch means of said second relay means whereby two successive actuations of said first relay means commencing in the first position thereof and within the time decay interval actuates said second relay means to thereby produce a change in said second control circuit.

4. In a remote control system for operating two functions of an electrical device by means of signal energy of a single given frequency radiated in space as first and second signals having respective durations of $T_1$ and $T_2$ seconds, a receiver for said signals including in combination, transducer means and amplifier means for receiving and translating the signal energy, detector means coupled to said amplifier means and tuned to the given frequency to provide an output voltage with respect to a reference point in response to each of said signals, a relay vacuum tube controllable by said output voltage and having a control grid and also a cathode connected to the reference point, grid resistor means connected between said detector means and said control grid, resistance means and biasing capacitance means connected in series with said biasing capacitance means being connected to said control grid, a source of direct current potential of a given value being connected across said resistance and biasing capacitance means for charging said biasing capacitance means, first latching relay means coupled to said relay vacuum tube and having first, second and third sets of contacts simultaneously operable to first and second positions upon successive actuations of said first relay means produced by the output voltage from said detecting means, conductor means including said second set of contacts connecting the junction of said resistance means with said biasing capacitance means to the reference point in the second position of said second set of contacts so that said grid resistor and biasing capacitance means are connected as an RC circuit having a time constant for suppressing said first signals, said second contacts disconnecting said conductor means in the first position of said second contacts so that said biasing capacitance means momentarily suppresses said second signal to thereby twice actuate said first relay means when said second signal is received with said first set of contacts in the first position, first control circuit means connected across said first set of contacts so that each actuation thereof controls one function of the electrical device, second relay means having second switch means controlled thereby, circuit means including further capacitor means intercoupling said second relay means and said third set of contacts of said first switch means in the first position thereof and with a further source of direct current potential being subject to time decay and connected across said further capacitor means in the second position of said third set of contacts for charging said further capacitor means, and second control circuit means connected across said second switch means for controlling a second function of the electrical device in response to said second signal.

5. In a remote control receiver for selectively controlling an on-off circuit and a channel change circuit of a television receiver in response to first and second predetermined signals of the same frequency and wherein signal translating means are adapted to provide an output voltage in response to said signals, a control circuit including in combination, first relay means coupled to said signal translating means and being operatively controlled by the output voltage therefrom, latching switch means actuated by said first relay means and having first and second pairs of contacts with the on-off circuit being connected across said first pair of contacts and controlled thereby, second relay means having a pair of contacts with the channel change circuit being connected thereacross and controlled thereby, circuit means coupling said second relay means across said second pair of contacts in the closed position thereof, said circuit means including capacitance means and resistance means series connected therein with one side of said capacitance means being connected to a reference point, bleeder resistance means connected between the other side of said capacitance means and the reference point, and a source of direct current potential subject to time decay connected across said capacitance means and through one contact of said second pair of contacts in the open position thereof for charging said capacitance means, whereby receipt of the first signal when the on-off circuit is closed actuates said first relay causing said latching switch means to open the on-off circuit, and whereby receipt of the second signal when said on-off circuit is closed twice actuates said first relay causing said on-off circuit to open with said capacitance means simultaneously being charged, and then to close, with said capacitance means discharging through said second relay means to momentarily close said channel change circuit.

References Cited in the file of this patent

UNITED STATES PATENTS

| | | |
|---|---|---|
| 2,345,472 | Goldsmith | Mar. 28, 1944 |
| 2,781,457 | Urban | Feb. 12, 1957 |